Patented Aug. 11, 1925.

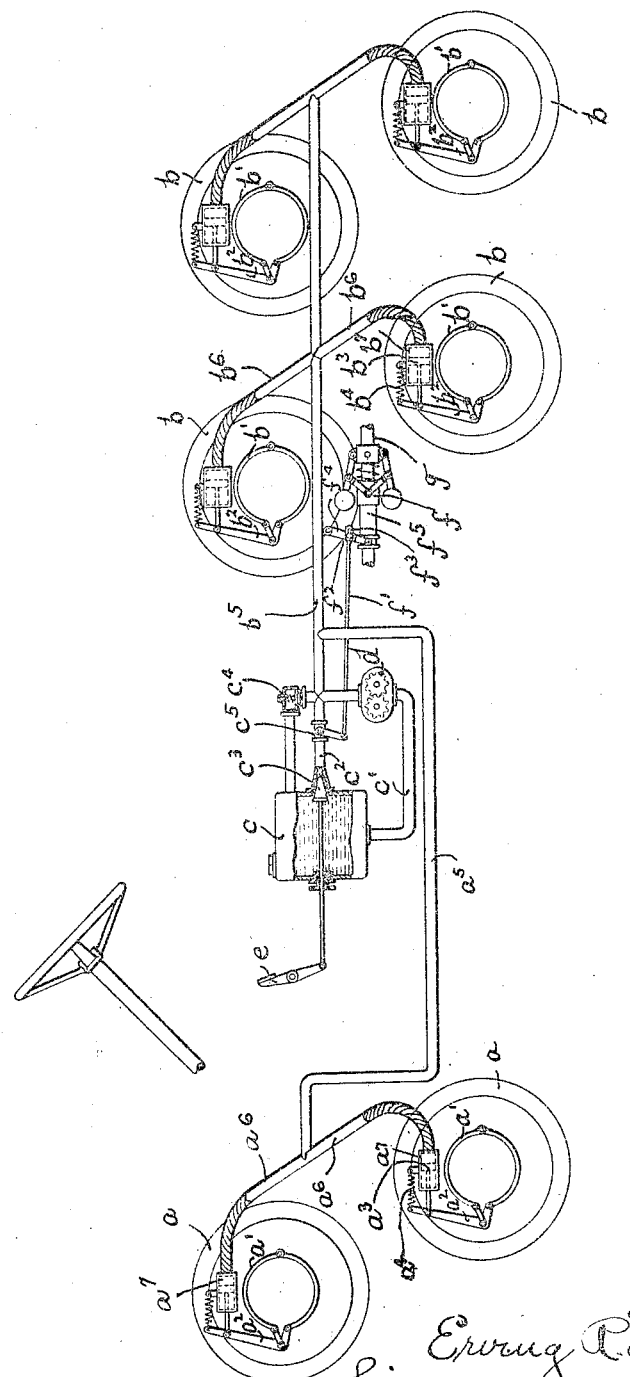

1,549,303

UNITED STATES PATENT OFFICE.

ERVING R. GURNEY, OF NEW YORK, N. Y., ASSIGNOR TO INTERNATIONAL MOTOR COMPANY, OF NEW YORK, N. Y., A CORPORATION OF DELAWARE.

SAFETY BRAKING DEVICE.

Application filed February 15, 1924. Serial No. 692,958.

*To all whom it may concern:*

Be it known that I, ERVING R. GURNEY, a citizen of the United States, residing in the borough of Queens, city and State of New York, have invented certain new and useful Improvements in Safety Braking Devices, of which the following is a specification, reference being had to the accompanying drawing, forming a part hereof.

This invention relates to safety braking devices for motor vehicles. It is an object of the present invention to provide brake operating mechanism for motor vehicles such as trucks and busses which shall be operative automatically when a predetermined speed is exceeded. Accordingly a governor is provided which is actuated by the propeller shaft or other moving part of the vehicle and is combined with brake actuating mechanism of the fluid pressure type so that when a predetermined speed is exceeded the governor will initiate the brake setting operations by the fluid pressure means. In order that the invention may be clearly understood and readily carried into effect the same will now be described more fully with reference to the accompanying drawing which illustrates, somewhat diagrammatically the application of the invention to fluid pressure brake operating mechanism.

In the drawings only so much of the parts of a motor vehicle are indicated as is deemed necessary to an understanding of the invention. The steering wheels are diagrammatically indicated at $a$, $a$ and the propelling wheels which in the present embodiment are four in number arranged in pairs in tandem are indicated at $b$. Braking power is applied to the wheels by means of brake bands $a'$ and $b'$, respectively. These brake bands are actuated by means of levers $a^2$, $b^2$, respectively, which are caused to move in setting the brakes by fluid operated pistons $a^3$, $b^3$, respectively and are normally held in retracted position by means of the springs $a^4$, $b^4$. In the illustrated embodiment the fluid pressure is illustrated as a liquid but it will be understood that other fluid pressure mediums are equally applicable. A reservoir $c$ is connected by means of a pipe $c'$ to a pump $d$ which is adapted to pump liquid from the reservoir through the pipes $a^5$, $a^6$ to the cylinders $a^7$ at the steering wheels $a$ and through the pipes $b^5$, $b^6$ to the cylinders $b^7$ at the driving wheels. A connection $c^2$ is also provided between the pump $d$ and reservoir $c$ which under normal conditions of operation would provide unobstructed circulation for the liquid from the pump to the reservoir. It will be apparent that the liquid from the pump will take the easiest path and the pressure will therefore tend to cause the liquid to flow back to the reservoir rather than to overcome the resistance of the pistons $a^3$ or $b^3$. When it is desired to set the brakes in the usual manner by means of the foot pedal $e$, the passage $c^2$ is caused to be closed by the valve $c^3$ actuated by foot lever $e$ whereupon the liquid will be forced by pump $d$ through the pipes $a^5$, $b^5$ to set the brakes. Any excess pressure over that necessary to set the brakes evenly will cause the liquid to force its way past the check valve $c^4$ and return it to the reservoir. So much of the brake operating mechanism as has just been described is well known and forms no part of the present invention.

In order to provide devices for setting the brakes which will operate when a predetermined speed of the vehicle is exceeded a governor of any usual type is associated with the propeller shaft of the vehicle, a fragment of which is indicated at $g$. This governor is connected to a valve $c^5$ in the line between the pump and reservoir by means of a link $f'$ having an elongated slot $f^2$ through which passes a pin $f^3$ carried by a lever $f^4$ pivoted at one end on the vehicle and at the other end on a sleeve $f^5$ forming a part of the governor. It will be apparent that the elongated slot $f^3$ permits a predetermined degree of movement of the sleeve $f^5$ whereby authorized speeds for the vehicle will have no effect upon the brake operating mechanism but so soon as the authorized speeds are exceeded, the extended movement of the sleeve $f^5$ will be translated to the valve $c^5$ through link $f'$ to cause that valve to close the connection $c^2$ in the same manner as the valve $c^3$ and initiate brake setting operations.

It will be apparent that the invention is not limited to the precise construction illustrated in the drawings but various modifications may be made in the type of brake actuating mechanism adopted and the speed metering devices actuated by a moving part of the vehicle and no limitation is intended except as indicated in the accompanying claims.

What I claim is:—

1. In a motor vehicle, the combination with wheels thereof and brakes for the wheels respectively, of hydraulically actuated brake operating mechanism therefor comprising a hydraulically actuated piston operatively associated with each brake and maintained within separate cylinders, respectively, each cylinder being connected to a fluid pressure pipe, a fluid pressure pump, a fluid reservoir, the pump and the reservoir being connected with each other in series and together in parallel with said pipe, a manually operable valve between the pump and the reservoir, an automatically operable valve between the pump and the reservoir, a fluid pressure pipe connecting the reservoir with the first named pipe and with the pump, a check valve in said last named pipe, and means operable with a moving part of the vehicle to operate said automatic valve.

2. In a motor vehicle, the combination with wheels thereof and brakes for the wheels respectively of hydraulically actuated brake operating mechanism therefor comprising a hydraulically actuated piston operatively associated with each brake and maintained within separate cylinders, respectively, the pairs of cylinders on each pair of wheels being connected, respectively, in parallel to a fluid pressure pipe, a fluid pressure pump, a fluid reservoir, the pump and the reservoir being connected with each other in series and together in parallel with said pipe, a manually operable valve between the pump and the reservoir, an automatically operable valve between the pump and the reservoir, a fluid pressure pipe connecting the reservoir with the first-named pipe and with the pump, a check valve in said last named pipe, and a governor operated by a moving part of the vehicle to operate said automatic valve to control the speed of the vehicle.

3. In a motor vehicle having six wheels, the combination with brakes for said wheels, respectively, hydraulically actuated brake operating mechanism therefor comprising, a hydraulically actuated piston operatively associated with each brake and maintained within separate cylinders respectively, each of said cylinders being connected through branch pipes to a central fluid pressure pipe, a fluid pressure pump, a fluid reservoir, the pump and the reservoir being connected in a closed circuit by a fluid pressure pipe, a check valve in said pipe, a pipe connecting said central pipe with the pump and reservoir at a point in the circuit between the pump and the check valve, a pipe connecting the reservoir with the pump at the last named point, a manually operable valve located in the last named pipe at a point proximate to the reservoir, an automatically operable valve located in the said last named pipe at a point proximate its juncture with the other two pipes, and means to control said last named valve comprising a centrifugal governor carried with the drive shift of the vehicle and operatively connected with said last named valve.

This specification signed this 13th day of February A. D. 1924.

ERVING R. GURNEY.